United States Patent [19]

Yano et al.

[11] Patent Number: 5,129,681
[45] Date of Patent: Jul. 14, 1992

[54] METHOD OF RENDERING LAID PIPELINE FLEXIBLE AND PIPE JOINT SUITED FOR EXECUTING THIS METHOD

[75] Inventors: Masatoshi Yano, Suita; Koichi Matsui, Hyogo; Tadashi Fukushima, Tondabayashi, all of Japan

[73] Assignee: Yano Giken Co., Ltd., Osaka, Japan

[21] Appl. No.: 739,838

[22] Filed: Aug. 2, 1991

Related U.S. Application Data

[62] Division of Ser. No. 621,309, Nov. 30, 1990, Pat. No. 4,236,880.

[51] Int. Cl.$^5$ ............................................. F16L 27/04
[52] U.S. Cl. ........................................ 285/23; 285/264; 285/270; 285/271
[58] Field of Search ................... 285/23, 31, 166, 167, 285/264, 265, 270, 271, 275; 137/15, 318

[56] References Cited

U.S. PATENT DOCUMENTS

| | | | |
|---|---|---|---|
| 2,445,580 | 7/1948 | Kasten | 285/31 |
| 3,332,709 | 7/1967 | Kowalski | 285/23 |
| 4,429,903 | 2/1984 | Baker | 285/31 |
| 4,696,494 | 9/1987 | Schmitz | 285/31 X |

Primary Examiner—Alan Cohan
Attorney, Agent, or Firm—Webb, Burden, Ziesenheim & Webb

[57] ABSTRACT

A method of rendering an existing pipeline flexible, by cutting out an intermediate portion of a pipe in a ring form, inserting a pipe joint into a cutout position, and connecting the pipe joint to the pipe. The pipe joint used in this method includes a plurality of sleeves interconnected in a fluid-tight condition to be oscillatable relative to one another. The pipe joint is inserted into the cut-out position and connected to the pipe, with the plurality of sleeves substantially fixed to one another while being interconnected in the fluid-tight condition to be oscillatable relative to one another. The sleeve are thereafter released from the fixed state.

2 Claims, 5 Drawing Sheets

METHOD OF RENDERING LAID PIPELINE FLEXIBLE AND PIPE JOINT SUITED FOR EXECUTING THIS METHOD

This is a divisional of copending application Ser. No. 07/621,309, filed Nov. 30, 1990 now U.S. Pat. No. 5,063,957 issued Nov. 12, 1991.

BACKGROUND OF THE INVENTION

1. Field of the Invention

The present invention relates to a method of rendering flexible a pipeline laid on the ground or underground, in order to absorb bending of the pipeline and prevent damage when the pipeline yields to a land subsidence or an earthquake. More particularly, the invention relates to a method of rendering an existing pipeline flexible, in which an intermediate portion of a pipe is cut and removed in a ring form, and a pipe joint is inserted in the cutout position and connected to the pipe with a plurality of sleeves interconnected relatively oscillatably in a watertight condition. The invention also relates to a pipe joint suited for executing this method.

2. Description of the Prior Art

In a convention method of rendering an existing pipeline flexible, a pipe joint is inserted in a cutout position of a pipe and connected to the pipe with a plurality of sleeves interconnected relatively oscillatably in a watertight condition.

In the above conventional method, however, opposite ends of the pipe joint tend to become displaced relative to cut ends of the pipe during a connecting operation since the plurality of sleeves are inserted in the cutout position in a condition easily oscillatable relative to one another. Great trouble and efforts are needed to connect the pipe joint to the existing pipe uniformly in the peripheral direction of the pipe.

SUMMARY OF THE INVENTION

The present invention has been made having regard to the state of the art noted above, and its object is to provide a method of rendering an existing pipeline flexible, and a pipe joint suited for executed this method, which readily realize a uniform connection peripherally of the pipe between the pipe joint and the pipe.

The above object is fulfilled, according to the present invention, by a method of rendering an existing pipeline flexible, comprising the steps of cutting out an intermediate portion of a pipe in a ring form, inserting a pipe joint into a cutout position, the pipe joint including a plurality of sleeves interconnected in a fluid-tight condition to be oscillatable relative to one another, and connecting the pipe joint to the pipe, wherein the pipe joint is inserted into the cutout position and connected to the pipe, with the plurality of sleeves substantially fixed to one another while being interconnected in the fluid-tight condition to be oscillatable relative to one another, and thereafter the plurality of sleeves are released from the fixed state.

The characterizing feature of the method according to the present invention for fulfilling the above-noted object lies in that the pipe joint is inserted into the cutout position and connected to the pipe, with the plurality of sleeves substantially fixed to one another while being interconnected in the fluid-tight condition to be oscillatable relative to one another, and thereafter the plurality of sleeves are released from the fixed state, and that the intermediate portion of the pipe is enclosed in a fluid-tight container, the portion of the pipe lying in the fluid-tight container is cut out in a ring-form without stopping fluid supply, and then the pipe joint is inserted into the cutout position with a fluid present in the fluid-tight container.

The pipe joint suited for executing this method includes fixing section for releasably fixing the sleeves together while the sleeves are interconnected in a fluid-tight condition to be oscillatable relative to one another.

The pipe joint is connected to the pipe with the plurality of sleeves substantially prevented from oscillating relative to one another. Thus, connecting portions at opposite ends of the pipe joint do not readily become displaced from selected positions relative to cut ends of the pipe during a connecting operation.

The pipe joint having the fixing sections for releasably fixing the sleeves together allows the fixed sleeves to be released without requiring a field operation involving trouble and equipment such as for welding the sleeves together and then removing welded portions again.

With the method of rending an existing pipeline flexible according to the present invention, the pipe joint may be connected periperally uniformly to the pipe with ease since the connection portions at opposite ends of the pipe joint do not readily become displaced from selected positions relative to cut ends of the pipe during a connecting operation.

According to the method in which the step of connecting the pipe joint to the pipe is carried out by enclosing the intermediate portion of the pipe with a fluid-tight container, cutting out in a ring-form the portion of the pipe lying in the fluid-tight container without stopping fluid supply, and then inserting the pipe joint into the cutout position with a fluid present in the fluid-tight container, the connecting portions at opposite ends of the pipe joint do not readily become displaced from selected positions relative to cut ends of the pipe during a connecting operation despite the fluid flowing through the pipe. This provides the advantage of the pipe joint being connectable peripherally uniformly to the pipe with ease.

The pipe joint according to the present invention allows the sleeves to be fixed and released relative to one another with ease.

BRIEF DESCRIPTION OF THE DRAWINGS

The drawings show a method of rendering an existing pipeline flexible and a pipe joint suited for executing this method according to the present invention. In the drawings.

DETAILED DESCRIPTION OF THE PREFERRED EMBODIMENTS

An embodiment of the present invention will be described in detail hereinafter with reference to the drawings.

Figure 3:
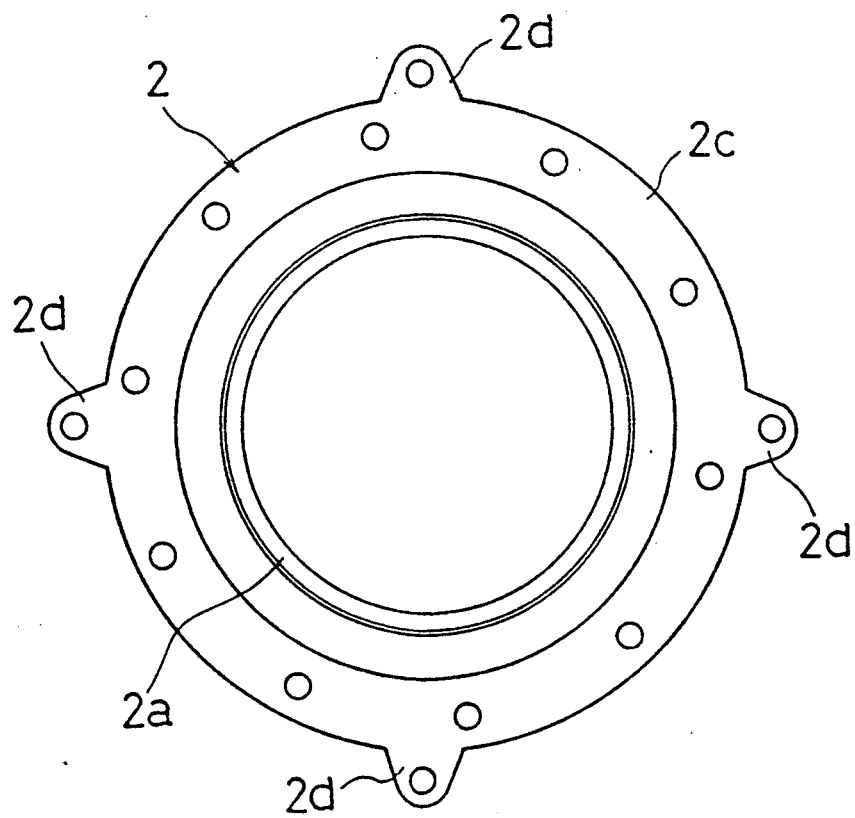
FIG. 3 is an end view of the pipe joint.
Figure 2:
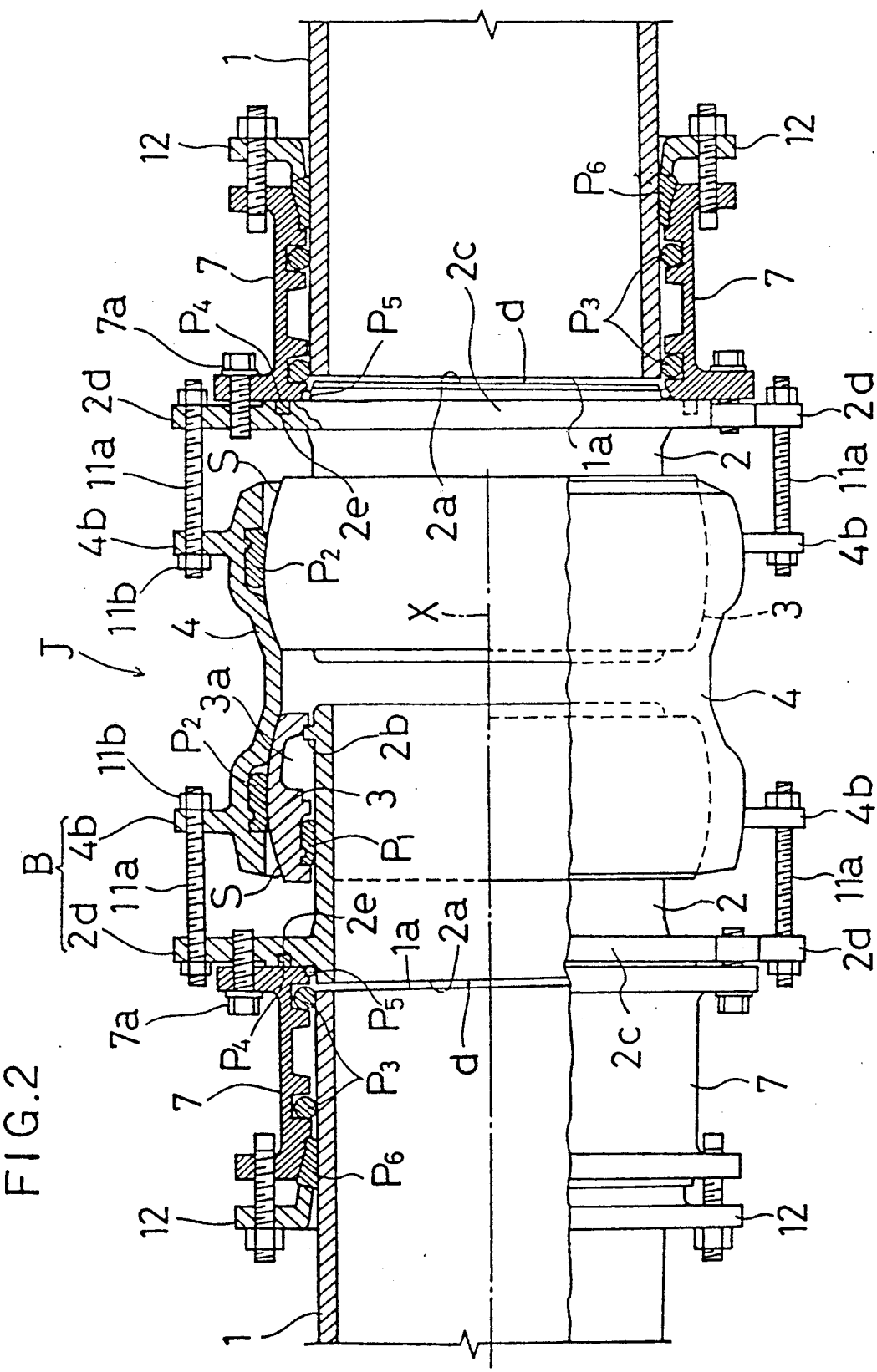
FIG. 2 is a side view, partly in section, of the pipe joint.

As shown in FIGS. 2 and 3, a pipe joint J includes two connecting sleeves 2 each having an end face 2a opposed to a cut end of a laid pipe 1 and shaped to cross a plane perpendicular to an axis X of the pipe 1. A ring element 3 is mounted on each connecting sleeve 2 to be slidable along the axis X with a rubber ring P1 sandwiched therebetween to act as a packing. A linking sleeve 4 bridges outer peripheries of the ring elements 3 with rubber rings P2 sandwiched therebetween to act as packings. The connecting sleeves 2 are extendible and contractible within a range determined by a range through which a lock ring 2b secured to each connecting sleeve 2 is movable within an annular recess 3a defined in an inside peripheral wall of the ring element 3. The ring elements 3 and the linking sleeve 4 are in slidable contact through spherical surfaces S. Thus, the three sleeves 2 and 4 are oscillatable relative to one another along the spherical surfaces S while maintaining a fluid-tight condition.

Next, a method of rendering an existing pipeline flexible will be described taking a water pipe 1 buried underground for example. In this method, the pipe joint J is connected to the water pipe 1 without stopping water supply through the pipe 1.

Figure 1A:
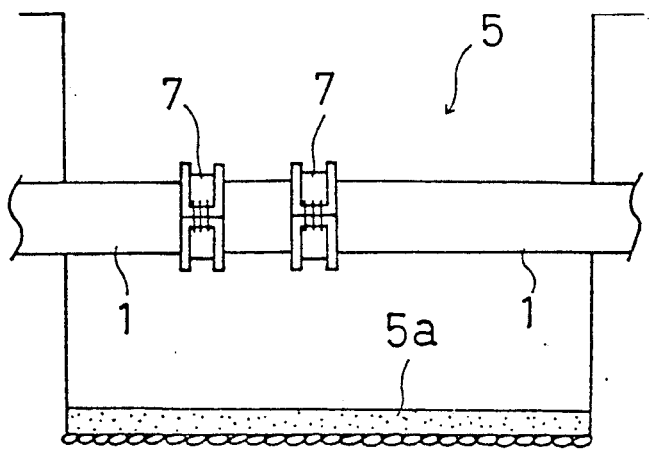
FIGS. 1(a) through 1(f) are explanatory views of the method according to the present invention.

As shown in FIG. 1(a), a pit 5 is dug to expose the water pipe 1, and the bottom of the pit 5 is covered with concrete to form a supporting base 5a for a hydraulic tank 6 acting as a watertight container to be described later. As shown in FIG. 2, outer surfaces of the water pipe 1 are cleaned and round rubber pieces P3 are wound thereon and joined in an O-ring form to act as packings. Then, two vertically dividable split rings 7 are fitted on the water pipe 1 as spaced apart axially of the pipe 1, with the rubber O-rings P3 in between.

Figure 1B:
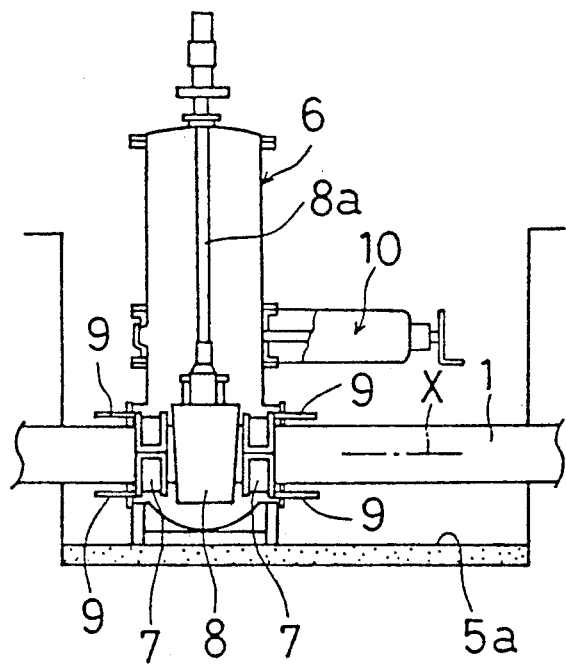

Next, as shown in FIG. 1(b), a cutting machine 8 is mounted between the two split rings 7, and a hydraulic tank 6 including two, upper and lower parts is placed on the supporting base 5a for straddling the water pipe 1 in a watertight condition. Push rods 9 are placed to extend through the hydraulic tank 6 for pushing the split rings 7 along the axis X. Further, a transmission shaft 8a connected to a drive shaft of the cutting machine 8 is placed to extend through a top surface of the hydraulic tank 6 in a watertight condition to be vertically slidable.

Figure 1C:
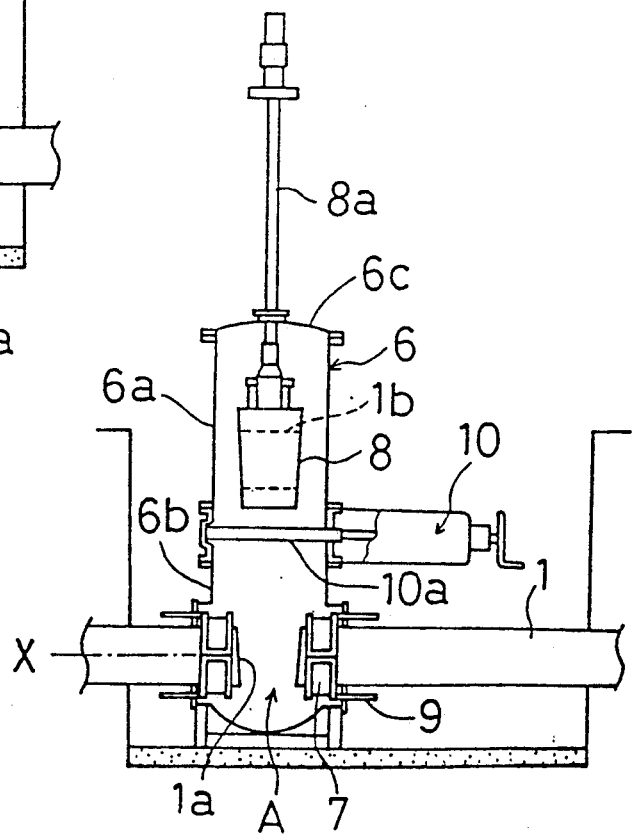

After confirming the watertight condition of the hydraulic tank 6, the cutting machine 8 is driven to cut a portion of the water pipe 1 in a ring form with end faces 1a intersecting planes perpendicular to the axis X. As shown in FIG. 1(c), the cutting machine 8 is lifted with a ring-like cut pipe portion 1b to an upper position in the hydraulic tank 6 by the transmission shaft 8a. Then, a sluice valve 10 is operated to parition the interior of the hydraulic tank 6 with a valve closure member 10a into an upper tank 6a enclosing the cutting machine 8 and a lower tank 6b enclosing a cutout position A of the water pipe 1.

Next, the interior of the upper tank 6a is decompressed approximately to atmospheric pressure by discharging water therefrom. The ring-like cut pipe portion 1b and cutting machine 8 are removed with a flanged cover 6c defining the upper surface of the upper tank 6a.

Figure 1D:
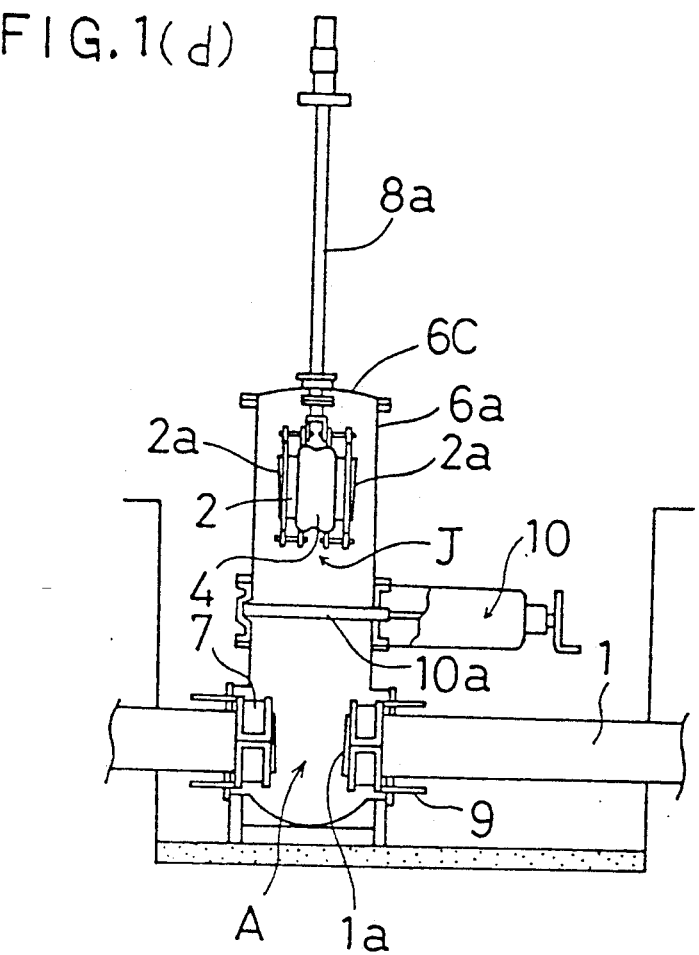

As shown in FIG. 1(d), the transmission shaft 8a now carrying the pipe joint J instead of the cutting machine 8 is inserted into the upper tank 6a. Then the flanged cover 6c is mounted on the upper tank 6a in a watertight condition.

The pipe joint J is attached to the transmission shaft 8a such that the three sleeves 2 and 4 are fixed coaxial to one another and slidable along the spherical surfaces S in a watertight condition.

More particularly, as shown in FIGS. 2 and 3, each of the connecting sleeves 2 defines a flange 2c for connection to the split ring 7. The flange 2c includes peripheral projections 2d formed integral therewith and defining bolt bores. These projections 2d and projections 4b formed integral with the linking sleeve 4 constitute a fixing section B for releasably fixing the interconnected sleeves 2 and 4 together through bolts 11a. The connecting sleeves 2 and linking sleeve 4 are movable along the axis X and fixable coaxially together by tightening nuts 11b until the lock rings 2b contact peripheral walls of the annular recesses 3a.

Figure 4:
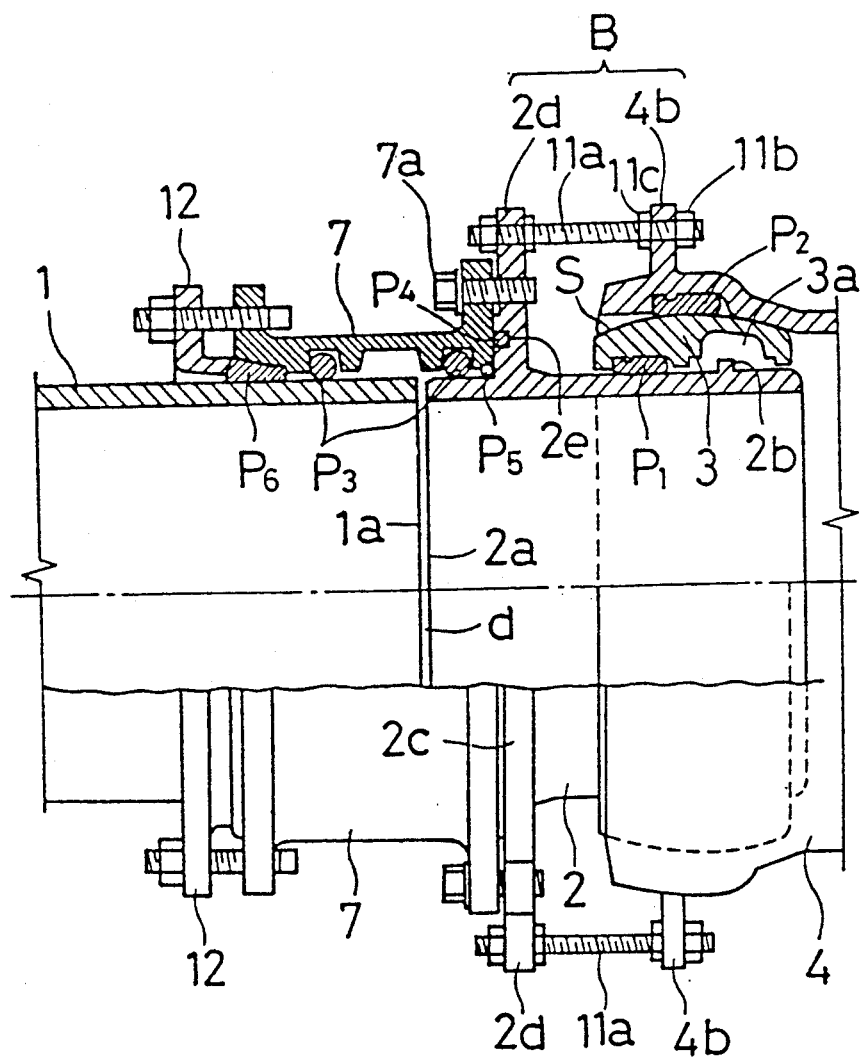
FIG. 4 is a sectional view of a principal portion of a different embodiment.

For compressing the pipeline axially thereof as a countermeasure against earthquakes, as shown in FIG. 4, fixing nuts 11b and 11c may be mounted on each bolt 11a as opposed to each other across the projections 2d and 4b of the sleeves 2 and 4 and tightened so that each lock ring 2b lies in an intermediate position of the annular recess 3a.

Figure 1E:
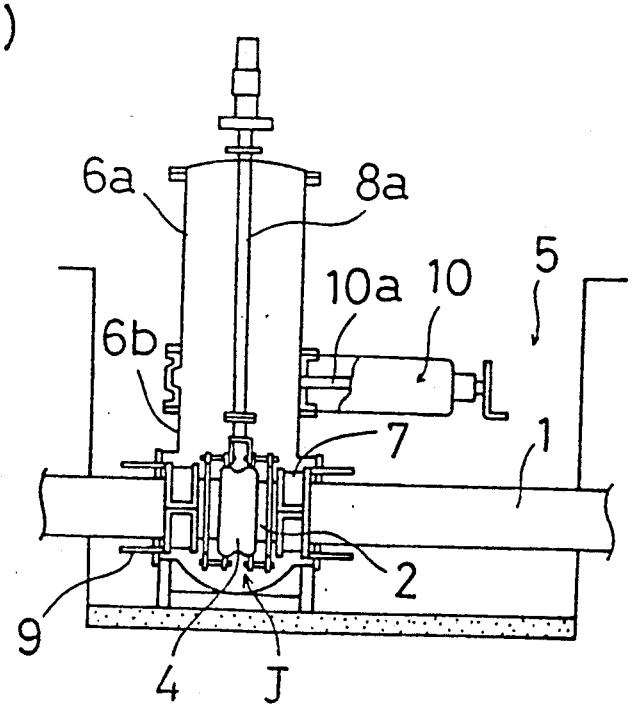

Next, water is fed from the lower tank 6b to the upper tank 6a through a bypass to eliminate a pressure difference therebetween. As shown in FIG. 1(e), the sluice valve 10 is opened and the pipe joint J is lowered by the transmission shaft 8a along a guide member (not shown) into the cutout position A.

The pipe joint J may be fitted into the cutout position A smoothly since the cut end faces 1a of the water pipe 1 diverge upwardly and the end faces 2a of the connecting sleeves 2 of the pipe joint J converge downwardly.

Then, a centering device (not shown) mounted in the lower tank 6b is operated to align the pipe joint J to the water pipe 1.

Figure 1F:
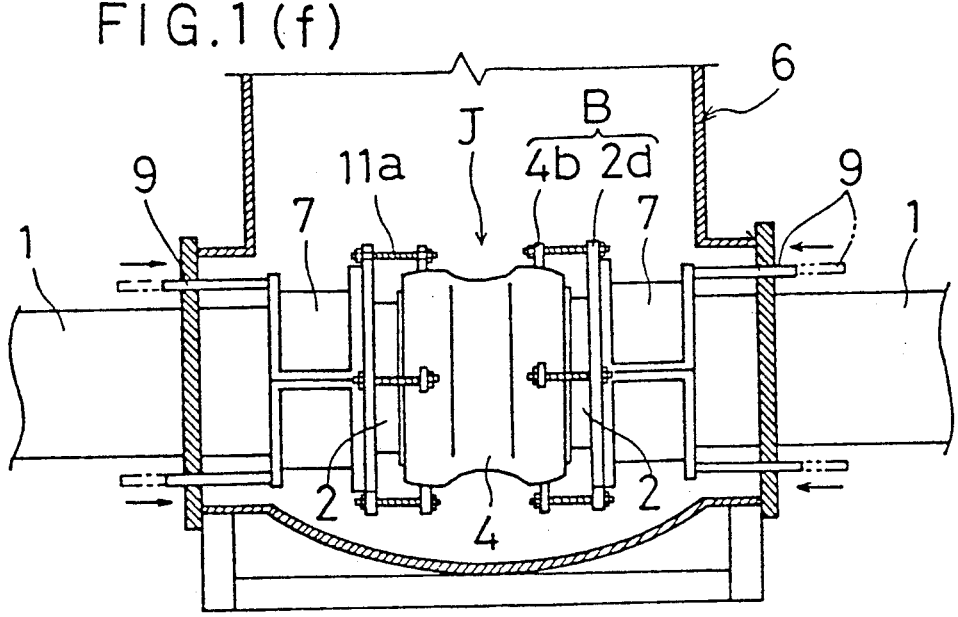

In this state, a slight space d is formed between the end face 2a of each connecting sleeve 2 and each end face 1a of the water pipe 1 (FIG. 4). As shown in FIG. 1(f), each split ring 7 is pushed with the push rods 9 toward the pipe joint J. As shown in FIG. 2 or 4, a gasket P4 fitted in an annular groove 2e formed in a flange face of each connecting sleeve 2 and an O-ring P5 of round rubber mounted around a foot portion of each flange 2c are compressed to stop water leakage through the space d in combination with the round rubber P3 formed into an O-ring.

Next, the interior of the hydraulic tank 6 is decompressed approximately to atmospheric pressure by discharging water therefrom. The flanged cover 6c is opened and, after the tank 6 becomes empty of water, the pipe joint J and transmission shaft 8a are separated in the hydraulic tank 6. As shown in FIG. 2, the flanges 2c of the connecting sleeves 2 are connected to the split rings 7 with bolts 7a.

After the hydraulic tank 6 is removed, as shown in FIG. 2 or 4, a brace 12 radially split into two parts is tightened to each split ring 7 to press a double bevel rubber ring P6 between the split ring 7 and water pipe 1. The bolts 11a and nuts 11b fixing the connecting sleeves 2 and linking sleeve 4 together are removed to unlock the sleeves 2 and 4, which completes the process of rendering the pipeline flexible by connecting the pipe joint J.

While the pipe joint J is connected without stopping water supply through the pipeline, the described method may be executed after stopping water supply. Further, this method is applicable to a pipeline laid on the ground.

The pipe joint used in the method according to the present invention may be only oscillatable and not extendible or contractible. The number of sleeves oscillatable relative to one another may be two, three or more.

The connecting sleeves 2 of the pipe joint J in the described embodiment may have a valving function.

The existing pipeline is not limited to a water pipe but may be a gas pipe or a pipeline for transmitting oil or other fluids.

What is claimed is:

1. A pipe joint comprising:
   a plurality of sleeves interconnected in a fluid-tight condition to be oscillatable to one another; and
   a fixing section for releasably fixing said sleeves together;
   wherein said sleeves include a pair of connecting sleeves and a linking sleeve, each of said connecting sleeves having a flange with integral connecting sleeve peripheral projections, said connecting sleeve peripheral projection defining bolt bores, said linking sleeve having integral linking sleeve projections defining bolt bores, said connecting sleeves and said linking sleeve being interconnected to each other through a pair of ring elements corresponding respectively to and slidably fitting on said two connecting sleeves and sealing members being interposed between said connecting sleeves, said ring elements and said linking sleeve so as to interconnect said two connecting sleeves oscillatable to each other and without being overlapped with each other;
   said fixing section releasably fixing said connecting sleeve projections and said linking sleeve projections through bolts passing through said connecting sleeve projections bolt bores and said linking sleeve projections defining bolt bores.

2. A pipe joint as defined in claim 1, wherein each of said ring elements includes a spherical shaped ring element sliding contact face and said linking sleeve includes spherical shaped linking sleeve sliding contact faces, respective linking sleeve sliding contact faces and ring element sliding contact faces come into sliding contact with each other so as to interconnect said three sleeves in a fluid-tight condition while allowing said sleeves to be slidable relative to each other along said respective linking sleeve sliding contact faces and ring element sliding contact faces.

* * * * *